United States Patent
Gwen

(10) Patent No.: US 12,428,314 B1
(45) Date of Patent: Sep. 30, 2025

(54) WATER FILTER ASSEMBLY HAVING AN ANTI-ROTATION CAP

(71) Applicant: CORE PACIFIC INC., Houston, TX (US)

(72) Inventor: Patrick Gwen, Houston, TX (US)

( * ) Notice: Subject to any disclaimer, the term of this patent is extended or adjusted under 35 U.S.C. 154(b) by 0 days.

(21) Appl. No.: 17/932,157

(22) Filed: Sep. 14, 2022

(51) Int. Cl.
*C02F 1/00* (2023.01)
*B01D 35/30* (2006.01)

(52) U.S. Cl.
CPC .............. *C02F 1/003* (2013.01); *B01D 35/30* (2013.01); *B01D 2201/4076* (2013.01); *B01D 2201/4092* (2013.01); *C02F 2201/006* (2013.01); *C02F 2307/04* (2013.01)

(58) Field of Classification Search
CPC ........ C02F 2201/006; B01D 2201/305; B01D 2201/4076; B01D 2201/4092
See application file for complete search history.

(56) References Cited

U.S. PATENT DOCUMENTS

| | | | |
|---|---|---|---|
| 5,328,609 | A | 7/1994 | Magnusson |
| 5,342,519 | A | 8/1994 | Friedmann |
| 5,407,571 | A | 4/1995 | Rothwell |
| 6,360,764 | B1 | 3/2002 | Fritze |
| 2005/0045552 | A1 | 3/2005 | Tadlock |
| 2006/0186026 | A1 | 8/2006 | Saleh |
| 2007/0000833 | A1 | 1/2007 | Levy |
| 2012/0261325 | A1* | 10/2012 | Brown ................ B01D 35/306 210/232 |
| 2015/0344321 | A1 | 12/2015 | Allsip |
| 2019/0282938 | A1 | 9/2019 | Fiox |

* cited by examiner

*Primary Examiner* — Benjamin M Kurtz
(74) *Attorney, Agent, or Firm* — Egbert, McDaniel & Swartz, PLLC

(57) ABSTRACT

A water filter assembly has a body with the neck, a filter received in the interior of the body, a cap threadedly affixed to the neck of the body, and a ring extending around the neck of the body. The ring has a plurality of elements that are engageable with a surface at the edge of the cap so as to prevent rotation of the cap with respect to the body. The surface at the edge of the cap has a plurality of indentations therein. The plurality of elements include a plurality of sawteeth that are engageable with the plurality of indentations. The ring has another plurality of sawteeth on an opposite side of the ring that are engageable with indentations formed in a shoulder of the body when the cap is rotated to a sealed position with respect to the body.

2 Claims, 4 Drawing Sheets

WATER FILTER ASSEMBLY HAVING AN ANTI-ROTATION CAP

CROSS-REFERENCE TO RELATED APPLICATIONS

Not applicable.

BACKGROUND OF THE INVENTION

1. Field of the Invention

The present invention relates to water filter cartridges. More particularly, the present invention relates to water filter cartridges having a body with a cap affixed thereto so as to cover a filter element within the interior of the body.

2. Description of Related Art Including Information Disclosed Under 37 CFR 1.97 and 37 CFR 1.98

Water filter assemblies, such as point-of-use water filtration systems, have become increasingly common in residential and commercial environments. There are many advantages to these types of systems in addition to improvements to taste and appearance of the water. In situations where the source water has been municipally treated, point-of-use systems allow the water to retain the disinfecting properties imparted by the municipality until the moment of use such that chances of undesirable material contamination is correspondingly reduced. These point-of-use filtration systems can also be individually tailored to treat specific properties of the source water.

One disadvantage of point-of-use filtration systems in the residential and commercial environment is that they must be designed to fit in the limited space that is available to house the systems. The design must be compact and unobtrusive. These elements must be designed to allow for frequent and easy replacement of used and exhausted filter elements. Because many of the users in the commercial and residential market are unfamiliar with the potential danger of working with a pressurized system, the filtration systems must be designed with the safety of the user in mind.

To that end, during normal operation of filters utilized in the point-of-use water filtration systems, the potential for self-uncoupling, i.e., disconnection without user intervention, of the filter cartridge from the filter manifold should be eliminated to prevent unwanted leakage and subsequent disengagement of the filter assembly while also permitting the assembly to disconnect safely should an increased pressure condition occur beyond the structural failure point of the filter assembly. Further, the active uncoupling of the filter cartridge from the filter manifold utilized in the system should also permit the relief of any excess pressure in a controlled manner to reduce the risk of damage or personal injury to the point-of-use water filtration system user.

In the art of water treatment, it is well-known to purify water for human consumption by implementing specific purifying processes. These purifying processes include, for example, the processes of filtration, sedimentation, bacterial digestion, distillation or reverse osmosis. In reverse osmosis, for example, a volume of liquid containing contaminants is introduced into a chamber on one side of a semi-permeable membrane (i.e. having pores large enough to pass the molecules of the liquid but not those of the solute contaminant). By pressurizing the liquid above its osmotic pressure, the liquid molecules will diffuse across the membrane but the solute molecules will remain. The resulting brine is then discarded and the liquid is thus purified and retained.

FIGS. 1-3 describe a water filter cartridge in accordance with the prior art. This water filter cartridge was taught in U.S. Pat. No. 7,799,220, issued on Sep. 21, 2010 to K. Fritze. In particular, this patent describes a hot disconnect replaceable water filter assembly. In FIGS. 1-3 herein, there is shown a representative embodiment of the filter cartridge 1 having a filter cap 2, a filter media 3, and a filter body 4. The filter cartridge can be used to complete a two-stage engagement structure. Filter media 3 can comprise a wide variety of filtering media, for example, depth filtration media, surface filtration media, sand filtration media, activated carbon filtration media, ion exchange filtration media, cross-flow membrane filtration media and hollow fiber filtration media. Filter cap 2 and filter body 4 can be fabricated of any suitable polymeric materials. The filter cap 2 in the filter body 4 are operatively joined using any suitable joining technique such as in engageable thread 5 (as illustrated in FIG. 1) or other alternative joining technique such as adhesives, heat welding, spin welding, ultrasonic welding and the like. Filter cartridge 1 generally has an attachment end 6 and a handling end 7.

As shown in FIG. 2, the body of filter cap 2 has a pair of opposed and identically configured multi-stage filter attachment members 10a, in the form of attachment ramps. The attachment ramp 10a can have a first angled portion 12a, a first horizontal portion 14a, a second angled portion 16a, a second horizontal portion 18a that is adjacent to the second angled portion 16a, and a third angled portion 19a.

As shown in FIG. 3, filter cap 2 has a projecting insertion wall 20. A plurality of venting notches 22 are spaced around the inner rim of the insertion wall 20. Filter cap 2 also has an interface surface 24 having a plurality of feed throughbores 26 and a return throughbore 28. As illustrated, interface surface 24 can further include a pair of arcuate kick-off ramps 30a and 30b.

One of the problems with this prior art system is that rotation is required so as to engage the ramp with the corresponding surfaces within the water filter assembly. Either during installation or removal, the cap 2 can be disengaged from the body 4 as a result of this rotation. Once disengagement occurs, the high pressures within the interior of the body 4 are released. This release of pressure can be potentially hazardous. In other circumstances, if the pressure is released, the filter will function improperly. In reverse osmosis systems, relatively high pressure is required. As such, it is important that the cap 2 remain secured to the body 4 during both installation and removal. The configuration shown in FIGS. 1-3 herein would allow one to be assured that the cap 2 is properly secured to the body 4 during installation. However, the reverse rotation of the body 4 for removal could have the effect of disengaging the cap 2 from the body 4 and, thereby, releasing pressure therefrom.

In many circumstances, so as to avoid this release of pressure, prior manufacturers of such types of water filter cartridges have sealed the cap 2 to the neck 5 of the body 4. As stated in/U.S. Pat. No. 7,799,220, this is done by adhesives, heat welding, spin welding, ultrasonic welding and the like. This type of joining technique properly assures that the cap 2 is rather permanently secured to the body 4 during both installation and removal of the filter cartridge 1 from the water filter assembly. However, this also assures that the cap can never be removed from the body without destruction of the cap and/or the body. The entire cartridge, including the filter 3 therein, will need to be disposed. As such, a need has developed so as to assure that the cap remains tightly secured to the body during both installation and removal while, at the same time, allowing the selective separation of the cap from the body without destruction of either the cap or the body.

In the past, various patents and patent application publications have issued with respect to such water filter assemblies. For example, U.S. Pat. No. 5,328,609, issued on Jul. 12, 1994 to Magnusson et al., describes a multi-stage radial flow filtration system. This system includes a disposable filter cartridge having first and second radial flow filtration stages containing filtration media of uniform porosity. A first stage includes a pair of annular, concentrically mounted, fibrous sediment and cast carbonaceous filter media. A second stage includes an annular cast carbonaceous filter media. Porous stage separators sequentially direct liquid flow into cavity spaces between the side walls of each stage and a liquid impermeable housing where the flow is radially redirected inward toward a center outlet bore. The first stage filters suspended sediments, lead and other heavy metals. The second stage removes suspended bacteria, parasites, volatile organic contaminants, herbicides, pesticides, industrial and agricultural contaminants, and the like. Various cartridge constructions have alternating O-ring sealed and caps.

U.S. Pat. No. 5,342,519, issued on Aug. 30, 1994 to Friedmann et al., describes a fluid filter cartridge with replaceable filter element. This is a spin-on fluid filter cartridge having a replaceable filter element which has an housing, an internally threaded annular collar, a replaceable filter element, and an externally threaded mounting head assembly. The annular collar is secured inside the housing and its open upper end. A sealing ring and an annular channel adjacent the external threads of the mounting head seals the cartridge when the mounting head assembly is threaded onto the annular collar.

U.S. Pat. No. 5,407,571, issued on Apr. 18, 1995 to C. N. Rothwell, provides a filter unit for a modular filter assembly that comprises a head having a feed chamber and a discharge chamber, and a casing surrounding a filter element. Fluid flow from the feed chamber to the discharge chamber of the filter unit passes through the filter element. The head is provided with a first inlet opening and a first outlet opening which communicates with the feed chamber. The head is provided with a second inlet opening and a second outlet opening which communicate with the discharge chamber.

U.S. Pat. No. 6,360,764, issued on Mar. 26, 2002 to K. Fritze, shows a cartridge adapter for use in mating a filter cartridge to a filter manifold. This adapter assembly includes an adapter body having a manifold coupler and a cartridge coupler. The manifold coupler is for mating with the filter manifold and has an inlet fluidly communicable with a filter manifold fluid inlet and a fluid outlet being fluidly communicable with a filter manifold fluid outlet. A sealing means isolates an inlet flow of unfiltered water from an outlet flow of filtered water. The cartridge coupler mates with the filter cartridge and has an inlet fluidly communicable with a filter cartridge and an outlet in fluid communication with the manifold coupler inlet and a fluid outlet being fluidly communicable with a filter cartridge outlet and in fluid communication with the manifold coupler outlet. At least one valve is disposed in the adapter body to control the flow of water therethrough.

U.S. Patent Application Publication No. 2005/0045552, published on Mar. 3, 2005 to J. W. Tadlock, describes a fluid a modular fluid treatment apparatus and method in which modules of the system can each have a head that can be connected to one or more heads in different configurations. The relationship between the cartridge of the module and its corresponding head prevents fluid from entering between the cartridge and an external shell of the module. The module has a head with a substantially concentric inlet and outlet ports in fluid communication with a cartridge coupled to the head.

U.S. Patent Application Publication No. 2006/0186026, published on Aug. 24, 2006 to M. K. Saleh, provides a compact water purification apparatus for purifying water from a municipal water supply prior to a point-of-use. This water purification apparatus has multiple water purification units that can include cartridge filters for removing chlorine, rust and sediment, heavy metals, dissolved iron, hydrogen sulfide, chloroform, and lead. An ultraviolet light source is also connected in series. A bypass conduit is connected in parallel with the water purification units.

U.S. Patent Application Publication No. 2007/0000833, published on Jan. 4, 2007 to Levy et al., discloses a model modular fluid purification system having a disposable sump assembly and an improved flow distribution plate. The system is adaptable to a variety of configurations without the need for re-piping or re-plumbing of the installation.

U.S. Patent Application Publication No. 2015/0344321, published on Dec. 3, 2015 to M. L. Allsip, teaches a water filter assembly including a first filter cartridge and a second filter cartridge mounted to a manifold. The first and second filter cartridges are plumbed into the manifold such that unfiltered water from an inlet of the manifold flows in parallel to the first and second filter cartridges. A third filter cartridge is also mounted to the manifold. The third filter cartridge is plumbed into the manifold such that the filtered water from the said first and second filter cartridges is directed into the third filter cartridge.

U.S. Patent Application Publication No. 2019/0282938, published on Sep. 19, 2019 to Fiox et al., discloses a modular filtration platform having at least one manifold head and at least one respective filter cartridge assembly. Each manifold head is connected to one another to establish a water flow in series or parallel. Each filter cartridge assembly is releasably secured from rotation relative to the manifold head by a locking mechanism. An aperture on the filter cartridge assembly's annular collar mates with a protruding resilient extension on either the manifold head or the support bracket. An integrated sensor package can be integrated with the system for true managed water visible/audible indications.

It is an object of the present invention to provide a water filter cartridge that allows the filter within the cartridge to be selectively replaced.

It is another object of the present invention to provide a water filter cartridge that is tamper-proof.

It is another object of the present invention to provide a water filter cartridge that prevents rotation of the cap with respect to the body.

It is another object of the present invention to provide a water filter cartridge that avoids accidental separation or unscrewing of the cap with respect to the body.

It is another object of the present invention to provide a cartridge for a water filter assembly that allows the cartridge to be used multiple times.

It is a further object of the present invention to provide a water filter cartridge that can be recycled for future use.

It is another object of the present invention provide a cartridge for a water filter assembly that maintains a pressure-containing environment for reverse osmosis filters during both installation and removal of the filter.

It is a further object of the present invention to provide a cartridge for a water filter assembly which avoids the use of glue, adhesives, and other techniques for sealing the cap to the body.

It is still further object of the present invention provide a water filter cartridge that has an extended life.

These and other objects and advantages of the present invention will become apparent from a reading of the attached specification and appended claims.

BRIEF SUMMARY OF THE INVENTION

The present invention is a water filter assembly that has a body having a neck, a filter received in the interior of the body, a cap threadedly affixed to the neck of the body, and a ring extending around the neck of the body. The cap has a first portion extending outwardly of a second portion thereof. The second portion has an edge opposite to the first portion. The ring has a plurality of elements engageable with a surface at the edge of the cap so as to prevent rotation of the cap with respect to the body.

The surface of the edge of the cap has at least one indentation therein. At least one of the plurality of elements is engageable with the indentation. In particular, the indentation comprises a plurality of sawtooth indentations. The plurality of elements include a plurality of sawteeth respectively engageable with the plurality of sawtooth indentations of the cap when the cap is rotated to a sealed position. As used herein, "sawtooth indentations" and "sawteeth" are interchangeable since "sawteeth" will inherently have indentations between the respective teeth. Similarly, "sawtooth indentations" will inherently have sawteeth between the respectively indentations.

The body has a shoulder adjacent to the neck of the body. The ring has at least some of the plurality of elements engageable with the shoulder so as to prevent rotation of the ring with respect to the body. The shoulder of the body has at least one indentation therein. At least some of the plurality of elements are engageable with the indentation of the shoulder. This indentation of the shoulder of the body includes a plurality of sawtooth indentations. The plurality of elements include a plurality of sawteeth that are respectively engageable with the plurality of sawtooth indentations of the shoulder when the cap is rotated to a sealed position. The plurality of elements of the ring include a plurality of sawteeth extending from the ring in a direction opposite to a direction in which the sawteeth engageable with the sawtooth indentations at the shoulder of the body extend.

In particular, the ring has a plurality of sawteeth on one side thereof and a plurality of sawteeth on an opposite side thereof. The plurality of sawteeth on one side extend in a direction opposite to a direction of the plurality of sawteeth on the opposite side. The plurality of sawteeth on the one side of the ring are arranged in a plurality of series of sawteeth. The plurality of sawteeth on the opposite side of the ring are arranged in a plurality of series of sawteeth. Each of plurality of series of sawteeth on one side are spaced from each other so as to alternate in location with respect to respective series of the plurality of series of sawteeth on the opposite side of the ring around a circumference of the ring.

The neck of the body has flat surfaces thereon. The ring has an interior diameter with flat surfaces that correspond with the flat surfaces at the neck of the body.

The ring has a reduced thickness area formed in a location around the circumference of the ring. This reduced thickness area comprises a first cut-out formed on one side of the ring and a second cut-out formed on an opposite side of the ring.

The first portion of the cap has a flange or ramp extending outwardly therefrom. This flange or ramp is adapted to engage with a corresponding member so as to lock the body in a fixed position. The cap is rotatable relative to the body until the cap reaches a sealed position. The plurality of elements of the ring engage the surface of the edge of the cap and engage a shoulder of the body so as to lock the cap against rotation relative to the body.

The present invention is also a ring for locking a cap to a body of a water filter cartridge. The ring has an annular member having a first side and a second side. The first side is a plurality of sawteeth formed thereon. The second side has a second plurality of sawteeth formed thereon. The first plurality of sawteeth extend in a direction opposite to a direction of the second plurality of sawteeth. The first plurality of sawteeth are adapted to engage corresponding indentations on the cap. The second plurality of sawteeth are adapted to engage corresponding indentations on the body so as to lock the cap against rotation.

The annular member has a plurality of flats formed on an inner surface of the annular member. The plurality of flats are adapted to bear against corresponding flats formed on the body so as to fix a position of the annular member with respect to the body. The annular member has a reduced thickness area formed in a location around a circumference of the annular member. The first plurality of sawteeth are arranged in a first plurality of series of sawteeth. The second plurality of sawteeth are arranged in a second plurality of series of sawteeth. Each series of the first plurality of series of sawteeth are spaced from each other so as to alternate in location with respect to series of the sawteeth of the second plurality of sawteeth around a circumference of the annular member.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
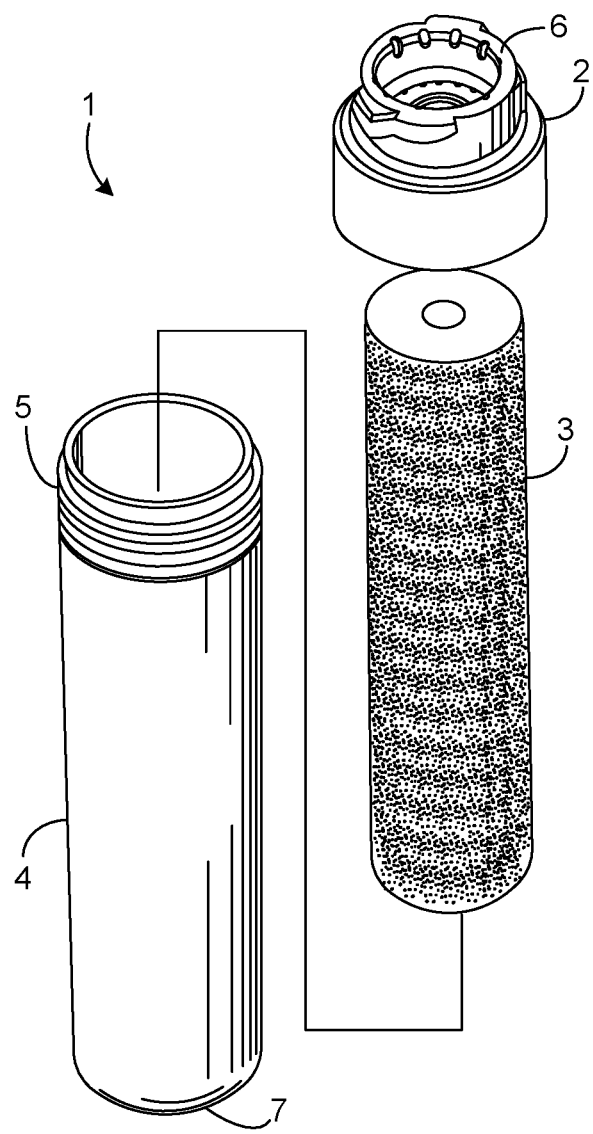
FIG. 1 is an exploded perspective view of a prior art water filter cartridge.
Figure 2:
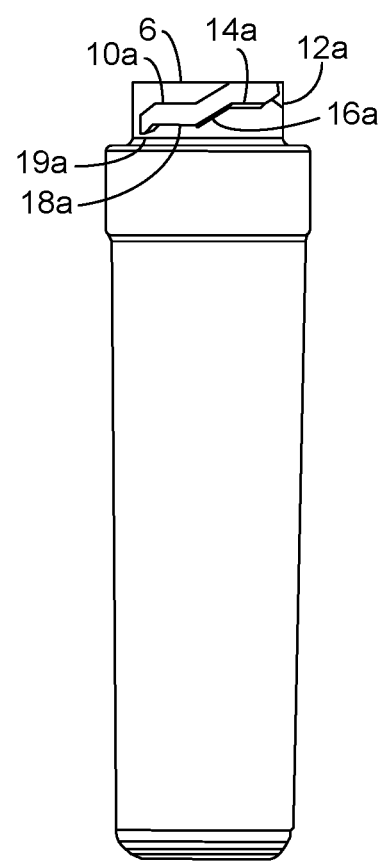
FIG. 2 is a side elevated view of the water filter cartridge of the prior art.
Figure 3:
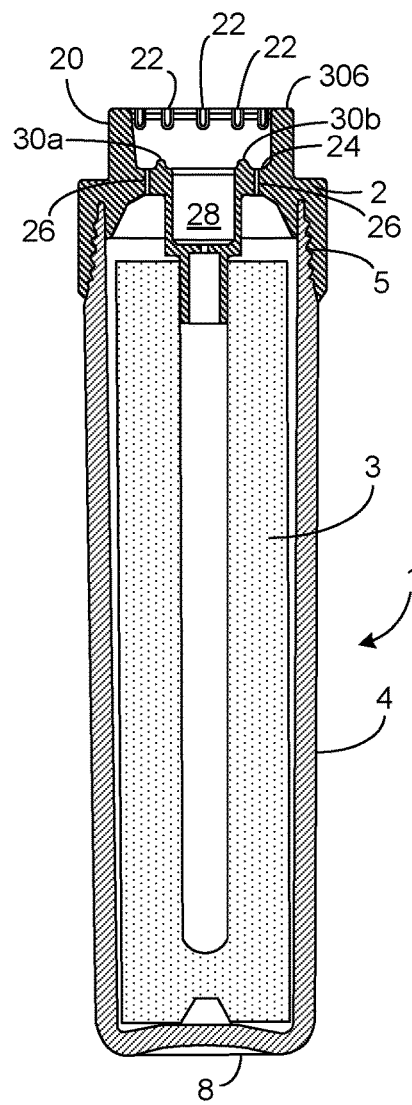
FIG. 3 is a cross-sectional view of the water filter cartridge in accordance with the prior art.
Figure 4:
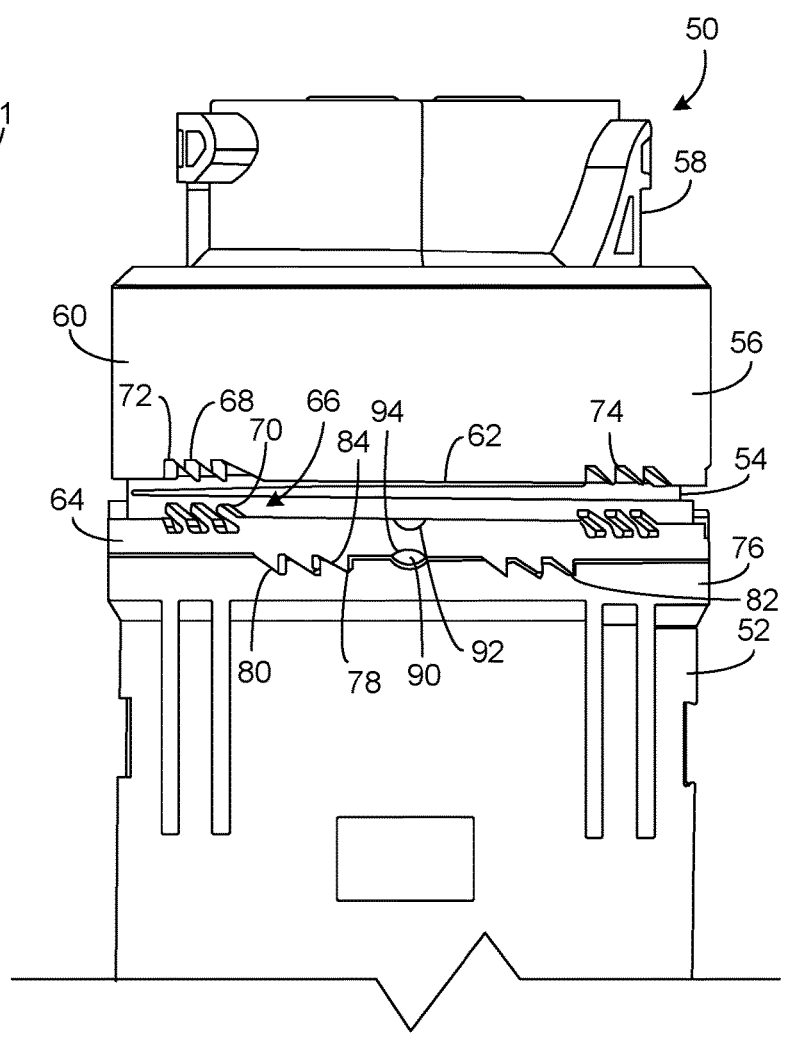
FIG. 4 is a side elevational view showing the water filter cartridge of the present invention with the cap as separated from the ring and the body.

FIG. 4 shows the water filter cartridge 50 in accordance with the teachings of the present invention. The water filter cartridge 50 includes a body 52 having a neck 54. A filter (such as the type shown in FIGS. 1-3) is received in the interior of the body 52. A cap 56 is threadedly affixed to the neck 54 of the body 52. The cap has a first portion 58 extending outwardly of a second portion 60. The second portion has an edge 62 opposite the first portion 54 and generally at the bottom of the cap 56. A ring 64 extends around the neck 54 of the body 52. The ring 64 has a plurality of elements 66 that are engageable with a surface that the edge 62 of the cap 56 so as to prevent rotation of the cap 56 with respect to the body 52.

The surface at the edge 62 of the cap 56 has a plurality of sawtooth indentations 68 formed therein. The plurality of elements 66 include a plurality of sawteeth 70 that are respectively engageable with a plurality of sawtooth indentations 68. The plurality of sawtooth indentations 66 at the edge 62 of cap 56 arranged in a first series 72 of sawtooth indentations and a second series 74 of sawtooth indentations. The body 52 has a shoulder 76 adjacent to the neck 54 of body 52. The shoulder 76 includes a plurality of sawtooth indentations 78 opening to a top surface at outer surface thereof. Sawtooth indentations 78 are arranged in a first series 80 of sawtooth indentations and a second series 82 of sawtooth indentations. The ring 64 has a plurality of sawteeth 84 that are engaged with the sawtooth indentations 78 at the shoulder 76 of body 52.

During installation of the cap 56 with respect to the body 52, the ring 64 is first placed over and around the neck 54 until the sawteeth 84 engage with the sawtooth indentations 78. The cap 56 can then be rotated on the threads of the neck 58 until the sawtooth indentations 68 receive the respective sawteeth 70 on the ring 64. This configuration will be shown in FIG. 5.

In FIG. 4, it can be seen that there is an area of reduced thickness 90 formed in a specific location around the circumference of the ring 64. This area of reduced thickness 90 includes a first cut-out 92 and a second cut-out 94.

Figure 5:
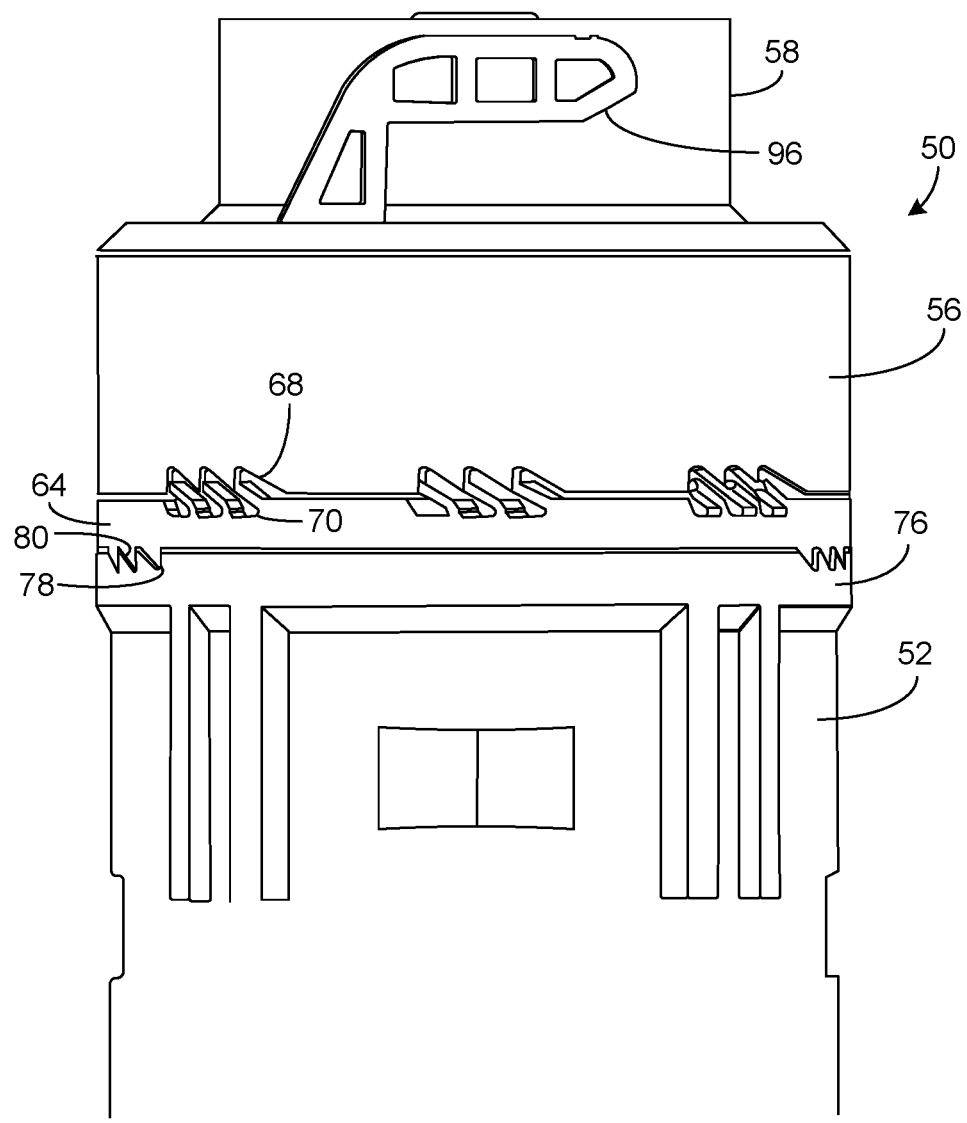
FIG. 5 is a side elevational view showing the water filter cartridge of the present invention with the cap as engaged with the ring and the body.

FIG. 5 shows that the cap 56 is now fully engaged with the body 52 so as to be in sealed relationship therewith. Suitable O-ring seals are placed within the neck of the body 52 and in the cap 56 so as to assure an air pressure-tight sealing relationship between the cap 56 and the body 52.

In the position shown in FIG. 5, the cap 56 has its sawtooth indentations 68 engaged with the sawteeth 70 on the ring 64. The shoulder 76 of body 52 has its sawtooth indentations 78 engaged with the sawteeth 80 of the ring 64. In this engagement, the cap 56 is prevented from rotation with respect to the body 52.

This arrangement based on the sawtooth indentations with the sawteeth, along with the configuration of the ring 64 with respect to the surfaces of the cap 56 and the body 52, assures that the cap 56 cannot be separated from the body 52 during rotation during installation or during removal. The relationship and engagement between the sawteeth of the ring and the sawtooth indentations assures that rotation in either direction is prevented. In order to assure this anti-rotation feature, the sawteeth 70 on one side of the ring 64 will extend in a different direction the than sawteeth 80 on the opposite side of the ring 64. This creates a strong anti-rotation seal between the body 52 and the cap 56. This configuration is resistant to any tampering. As such, any pressures or materials within the interior of the body 52 or within the filter in the body 52, will be prevented from being released by separation between the cap 56 and the body 52.

FIG. 5 shows that the first portion 58 of the cap 56 has a flange or ramp 96 formed thereon. This flange or ramp 96 will function to allow engagement between the water filter cartridge 50 with a water filter assembly. This would be in the manner described and shown in association with the prior art of FIGS. 1-3.

Figure 6:
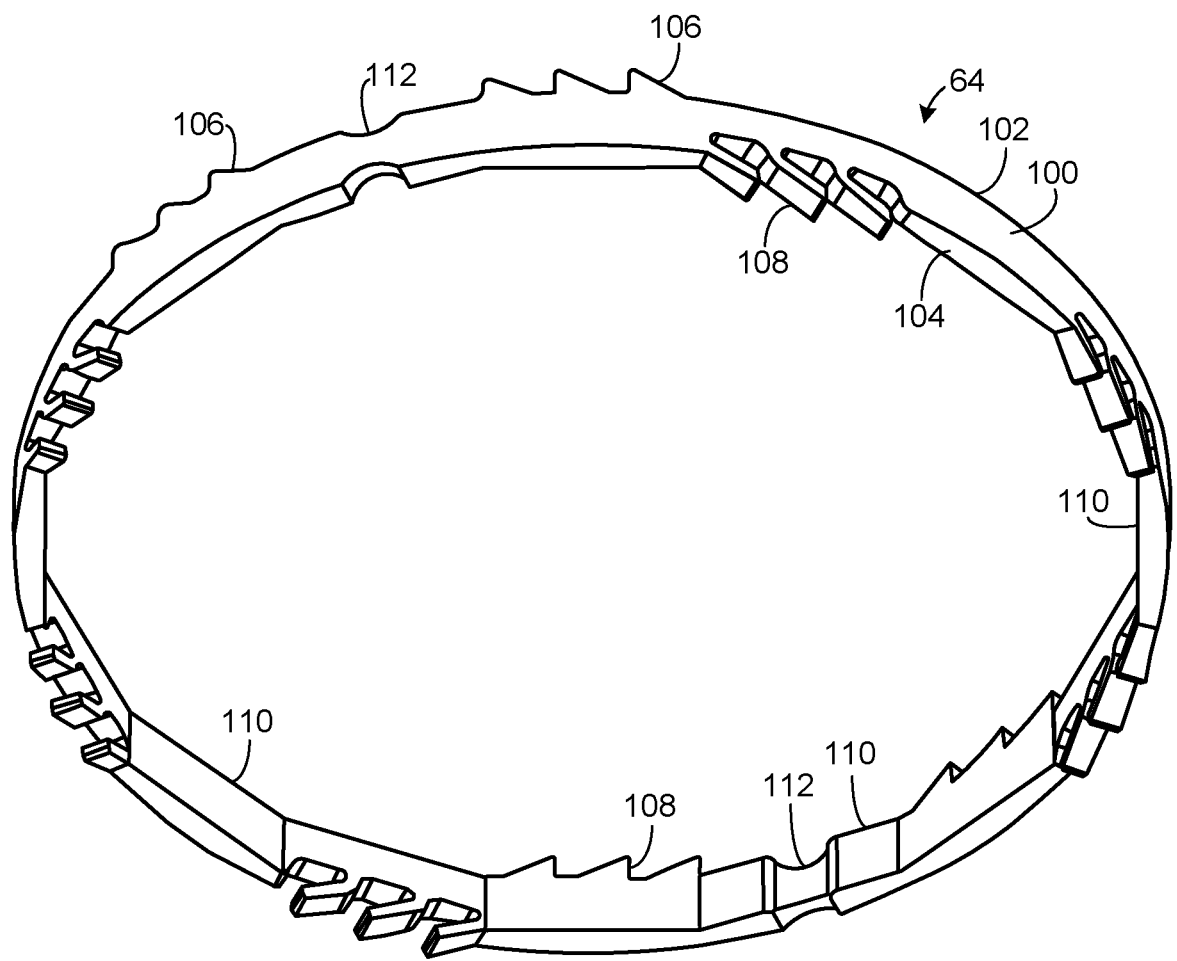
FIG. 6 is a lower perspective view of the ring of the water filter cartridge of the present invention.

FIG. 6 shows the ring 64 as used in the present invention. Ring 64 is intended to lock the cap 56 to the body 52 of the water filter cartridge 50. In particular, the ring 64 includes an annular member 100 having a first side 102 and a second side 104. The first side 102 has a first plurality of sawteeth 106 formed thereon. The second side 104 has a second plurality of sawteeth 108 formed thereon. The first plurality of sawteeth 106 extend in a direction opposite to a direction of the second plurality of sawteeth 108. The first plurality of sawteeth 106 are adapted to engage corresponding indentations on the cap 56. The second plurality of sawteeth 108 are adapted to engage indentations on the body 52 so as to lock the cap against rotation. A unique feature of the ring 64 is the flat surfaces 110 formed on an inner wall of the annular member 100. These flat surfaces 110 are intended to bear against or be aligned with flat surfaces of the neck 54 of the body 52. As such, when the ring 64 is initially installed over the neck 54 of the body 52, these flat surfaces 110 will easily align with the flats on the neck 54 of the body 52 so as to assure a proper orientation of the ring 64 with respect to the body 52. This flat-against-flat configuration will assure that the ring 64 resists rotation during installation.

The annular member 100 includes reduced thickness areas 112 that are formed in locations around the circumference of the annular member 100. Reduced thickness areas 112 are particularly important since this is a manner in which the cap 56 can ultimately be separated from the body 52. In particular, after extended use, the filter cartridge 50 will need to be replaced. This filter cartridge can be returned to the factory, or other location, for refurbishment. In particular, in order to access the interior of the body 52 and the filter within the body 52, the cap 56 will need to be removed. This can be accomplished by simply cutting through the area of reduced thickness 110 with pliers or scissors. The annular member 100 can then be properly separated from its position between the cap 56 and the body 52. The cap then can be easily unscrewed from the neck 54 of the body 52. Ultimately, during refurbishment, a new filter can be installed and a new ring installed over the neck of the body 52. The cap can then be replaced and the filter cartridge 50 can then be redeployed for further use. This results in a longer life for the filter cartridge, less disposal costs, less expense, and reduced costs.

In FIG. 6, it can be seen that the first plurality of sawteeth 106 are arranged in a first plurality of series of sawteeth. The second plurality of sawteeth are arranged in a second plurality of series of sawteeth. The series of sawteeth alternate with each other around the circumference of the annular member 104. If the sawteeth on one side of the annular member 100 would be aligned with the sawteeth on the opposite side of the annular member, this could weaken the structure of the annular member. As such, this alternating arrangement of series of sawteeth further enhances the strength of the ring 64 and avoids damage or destruction to the ring.

As used herein, the terms "sawteeth" and "sawtooth indentations" are interchangeable. Clearly, whenever a sawtooth structure is employed, there will be both teeth and indentations between the teeth. As such, the use of the terms "sawtooth indentations" and "sawteeth" can be interchangeable with each other within the scope of the present invention.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A water filter cartridge comprising:
a body having a neck;
a filter received in the interior of said body;
a cap threadedly affixed to the neck of said body, the cap having an edge; and
a ring extending around the neck of said body, said ring having a plurality of elements engageable with a surface at the edge of said cap so as to prevent rotation of said cap with respect to said body, wherein the neck of said body has flats thereon, said ring having an inner diameter with flat planar surfaces that correspond with the flats of the neck of said body, the flat planar surfaces of said ring extending across an entire width of said ring on the inner diameter of said ring, said ring having a maximum inner diameter located between the flat planar surfaces, an inner surface of the flat planar surface extending inwardly of the maximum inner diameter, wherein the flats of the neck of said body bear against the flat planar surfaces of said ring so as to prevent rotation of said ring with respect to said body.

2. A water filter cartridge comprising:
a body having a neck;
a filter received in the interior of said body;
a cap threadedly affixed to the neck of said body, the cap having an edge; and
a ring extending around the neck of said body, said ring having a plurality of series of teeth engageable with a surface at the edge of said cap so as to prevent rotation of said cap with respect to said body, one series of the plurality of series of teeth being spaced by a non-toothed section between another series of the plurality of series of teeth, wherein said ring has a reduced thickness area formed in a location around a circumference of said ring, the reduced thickness area comprising a first cut-out formed on one edge of said ring and a second cut-out formed on an opposite edge of said ring in the non-toothed section between the one series of the plurality of series of teeth and the another series of the plurality of series of teeth.

* * * * *